US012676019B2

(12) United States Patent (10) Patent No.: US 12,676,019 B2
Beery (45) Date of Patent: Jul. 7, 2026

(54) **ADAPTIVE FILTER GENERATOR,
IDENTIFYING LINES AND TABLE
MORPHOLOGY**

(71) Applicant: **TUNGSTEN AUTOMATION
CORPORATION**, Irvine, CA (US)

(72) Inventor: David Edward Beery, Rapid City, SD
(US)

(73) Assignee: **TUNGSTEN AUTOMATION
CORPORATION**, Irvine, CA (US)

( * ) Notice: Subject to any disclaimer, the term of this
patent is extended or adjusted under 35
U.S.C. 154(b) by 462 days.

(21) Appl. No.: 18/037,979

(22) PCT Filed: Nov. 19, 2021

(86) PCT No.: PCT/US2021/072532
§ 371 (c)(1),
(2) Date: May 19, 2023

(87) PCT Pub. No.: WO2022/109610
PCT Pub. Date: May 27, 2022

(65) Prior Publication Data
US 2023/0410542 A1 Dec. 21, 2023

Related U.S. Application Data

(60) Provisional application No. 63/264,292, filed on Nov.
18, 2021, provisional application No. 63/116,763,
filed on Nov. 20, 2020.

(51) Int. Cl.
*G06F 40/258* (2020.01)
*G06F 40/268* (2020.01)

*G06V 30/10* (2022.01)
*G06V 30/40* (2022.01)
(Continued)

(52) U.S. Cl.
CPC .......... *G06V 30/412* (2022.01); *G06F 40/268*
(2020.01)

(58) Field of Classification Search
USPC ................ 382/113, 133, 317–325, 254–265;
705/26.1–29, 400–500
See application file for complete search history.

(56) References Cited

U.S. PATENT DOCUMENTS

| 3,976,982 A | 8/1976 | Eiselen |
| 5,841,900 A | 11/1998 | Rahgozar et al. |
| 6,006,240 A | 12/1999 | Handley |

(Continued)

OTHER PUBLICATIONS

International Search Report and Written Opinion from PCT Application No. PCT/US2021/72532, dated Feb. 18, 2022.
(Continued)

*Primary Examiner* — Marcellus J Augustin
(74) *Attorney, Agent, or Firm* — Zilka-Kotab, P.C.

(57) ABSTRACT

For table structure recognition in document processing, a methodology can use 2-click human interaction to define bounding box of the table and convert OCR data into n-dim positioning for column-wise and row-wise assignment. An adaptive filter can identify and assign column-like morphologies in tables. An adaptive cycle based column/row assignment can select best methodology for each table. Column overlap and merge detection can use post-processing for complex table structures. Data storage and feedback mechanisms can be used for adaptive template predictions.

19 Claims, 16 Drawing Sheets

(51) Int. Cl.
G06V 30/412 (2022.01)
G06V 30/413 (2022.01)

(56) References Cited

U.S. PATENT DOCUMENTS

| | | | | |
|---|---|---|---|---|
| 6,173,073 | B1 | 1/2001 | Wang | |
| 6,785,420 | B2 | 8/2004 | Yamaai | |
| 2009/0116736 | A1* | 5/2009 | Neogi | G06V 30/40 |
| | | | | 382/159 |
| 2011/0255782 | A1* | 10/2011 | Welling | G06V 30/262 |
| | | | | 382/173 |
| 2014/0079297 | A1 | 3/2014 | Tadayon et al. | |
| 2014/0369602 | A1* | 12/2014 | Meier | G06V 30/412 |
| | | | | 382/182 |
| 2015/0093021 | A1 | 4/2015 | Xu et al. | |
| 2015/0296193 | A1* | 10/2015 | Cote | G06T 3/4015 |
| | | | | 382/167 |
| 2016/0162782 | A1 | 6/2016 | Park | |
| 2016/0321540 | A1 | 11/2016 | Towal | |
| 2018/0096226 | A1 | 4/2018 | Aliabadi et al. | |
| 2019/0266394 | A1* | 8/2019 | Yu | G06V 30/413 |
| 2019/0310868 | A1* | 10/2019 | Vaindiner | G06V 30/416 |
| 2019/0340240 | A1* | 11/2019 | Duta | G06V 30/15 |
| 2019/0347547 | A1* | 11/2019 | Ebstyne | G06N 3/08 |
| 2020/0175267 | A1* | 6/2020 | Schäfer | G06V 30/413 |
| 2022/0067014 | A1* | 3/2022 | Yu | G06V 30/412 |
| 2023/0359876 | A1* | 11/2023 | Huynh | G06N 3/0464 |

OTHER PUBLICATIONS

Zhong et al., "Image-based table recognition: data, model, and evaluation," arXiv, Mar. 2020, 11 pages, retrieved from https://arxiv.org/abs/1911.10683.

Zhong et al., "PubLayNet: largest dataset ever for document layout analysis, " arXiv, Aug. 2019, 8 pages, retrieved from https://arxiv.org/abs/1908.07836.

Qasim et al., "Rethinking Table Recognition using Graph Neural Networks," arXiv, Jul. 2019, 6 pages, retrieved from https://arxiv.org/abs/1905.13391.

Holecek et al., "Table understanding in structured documents," arXiv, Jul. 2019, 7 pages, retrieved from https://arxiv.org/abs/1904.12577.

Li et al., "TableBank: A Benchmark Dataset for Table Detection and Recognition," arXiv, Jul. 2020, 9 pages, retrieved from https://arxiv.org/abs/1903.01949.

Milosevic et al., "A framework for information extraction from tables in biomedical literature," International Journal on Document Analysis and Recognition (IJDAR), Feb. 15, 2019, 24 pages.

Le Vine et al., "Extracting Tables from Documents using Conditional Generative Adversarial Networks and Genetic Algorithms," arXiv, Apr. 2019, 8 pages, retrieved from https://arxiv.org/abs/1904.01947.

Schreiber et al., "DeepDeSRT: Deep Learning for Detection and Structure Recognition of Tables in Document Images," 14th IAPR International Conference on Document Analysis and Recognition (ICDAR), 2017, 6 pages, retrieved from https://www.researchgate.net/publication/322783139_DeepDeSRT_Deep_Learning_for_Detection_and_Structure_Recognition_of_Tables_in_Document_Images.

Chi et al., "Complicated Table Structure Recognition," arXiv, Aug. 2019, 9 pages, retrieved from https://arxiv.org/abs/1908.04729.

Ocrspace, "Table Recognition with OCR," OCR Space, retrieved on Nov. 20, 2020, from https://ocr.space/tablerecognition, 4 pages.

Abbyy Finereader, "FineReader Online: How it works," ABBYY FineReader, retrieved on Nov. 20, 2020, from https://finereaderonline.com/en-us, 2 pages.

AWS, "Amazon Textract," Amazon, retrieved on Nov. 20, 2020, from https://aws.amazon.com/textract/, 7 pages.

Kofax, "OmniPage: Powerful OCR Software," Kofax OmniPage, retrieved on Nov. 20, 2020, from www.kofax.com/Products/omnipage, 4 pages.

Zanibbi et al., "A Survey of Table Recognition: Models, Observations, Transformations, and Inferences," School of Computing, Queen's University, Oct. 24, 2003, 33 pages.

Snoek et al., "Practical Bayesian Optimization of Machine Learning Algorithms," Conference on Neural Information Processing Systems, 2012, pp. 1-9, retrieved from https://proceedings.neurips.cc/paper/2012/file/05311655a15b75fab86956663e1819cd-Paper.pdf.

Rousseeuw, P., "Silhouettes: a graphical aid to the interpretation and validation of cluster analysis," Journal of Computational and Applied Mathematics, vol. 20, 1987, pp. 53-65.

Ester et al., "A Density-Based Algorithm for Discovering Clusters in Large Spatial Databases with Noise, " KDD-96 Proceedings, 1996, pp. 226-231.

Surh et al., "Noise Robust Depth from Focus using a Ring Difference Filter," CVPR, 2017, 10 pages, retrieved from https://openaccess.thecvf.com/content_cvpr_2017/papers/Surh_Noise_Robust_Depth_CVPR_2017_paper.pdf.

* cited by examiner

Table Examples

Original Image

| | |
|---|---|
| EACH | AZT-PCC305          576.00  EACH<br>CHAIR CASTLE 3"-3.25" REB SUPT<br>SALES TAX - 2.0% - HENDERSON<br>SALES TAX - 4.75% - NC<br><br>INVOICE TOTAL:<br><br>THANK YOU FOR YOUR BUSINESS!!!<br>IT IS GREATLY APPRECIATED! | |

Beery Variant Table Morphology Detector

Overview

Figure 5:
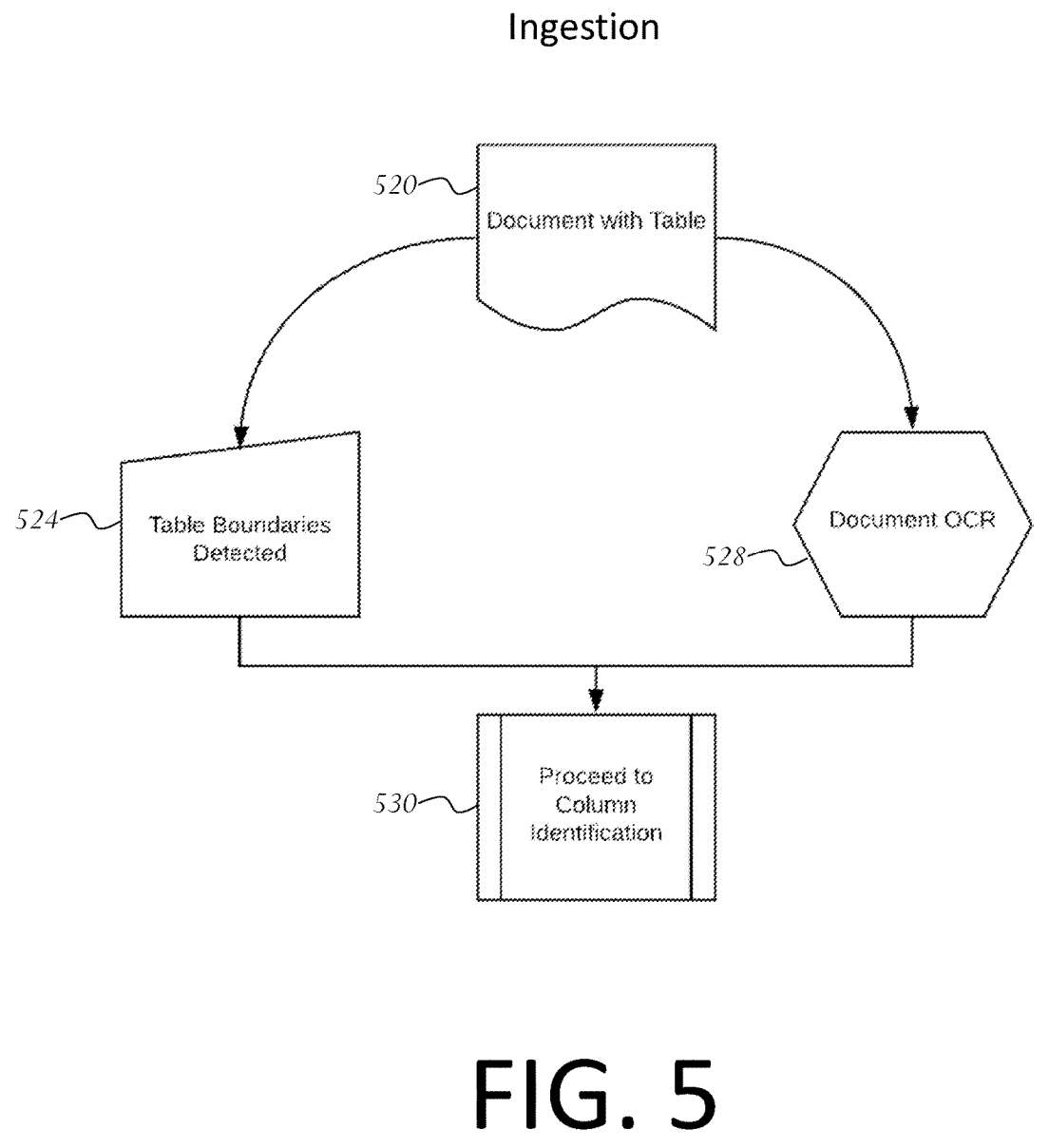

Ingestion

Document with Table

520

Document OCR

528

Table Boundaries Detected

524

Proceed to Column Identification

Column Identification

Row Identification

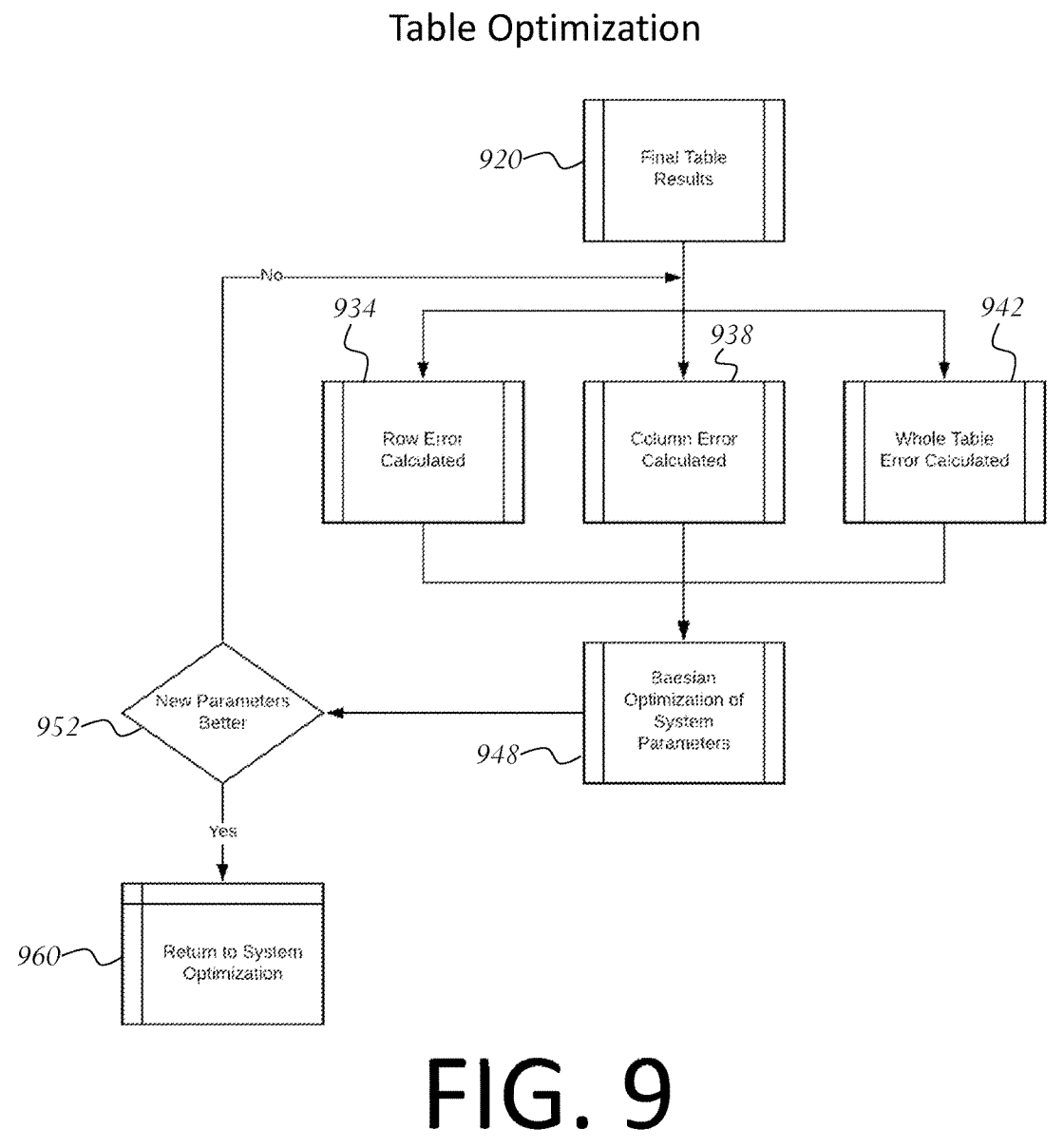

Table Optimization

Final Table Results — 920

Row Error Calculated — 934

Column Error Calculated — 938

Whole Table Error Calculated — 942

Baesian Optimization of System Parameters

948

New Parameters Better — 952

No

Yes

Return to System Optimization — 960

FIG. 9

System Optimization

Themis Parameters

| | Parameter | First Design | After 8 Months | After 1 Year |
|---|---|---|---|---|
| 1122 | X Threshold | 0.122 | 0.122 | 0.099 |
| 1124 | Y Threshold | 0.016 | 0.016 | 0.838 |
| 1126 | AlternativeEntropyX | 3 | 6 | 1.85 |
| 1128 | AlternativeEntropyY | 1.45 | 1.49 | 1.4 |
| 1132 | Intersection Threshold | 0.575 | 0.001 | 0.18 |
| 1134 | BVR Constant | -5 | -3.3 | 2.4 |
| 1136 | BVR Value Ratio | 0.9 | 1 | 0.25 |
| 1138 | BVR Center Expansion | 1 | 0 | 0 |
| 1142 | BVR Multiplier | 11 | 25 | 15 |
| 1144 | BVR Size | 9 | 9 | 5 |
| 1146 | BVR Binarization Threshold | 134 | 229 | 160 |

FIG. 12

ADAPTIVE FILTER GENERATOR, IDENTIFYING LINES AND TABLE MORPHOLOGY

INCORPORATION BY REFERENCE TO ANY PRIORITY APPLICATIONS

This application is a National Phase Application based on PCT Application No. PCT/US2021/072532, titled "ADAPTIVE FILTER GENERATOR, IDENTIFYING LINES AND TABLE MORPHOLOGY" filed Nov. 19, 2021. This Application also claims benefit of U.S. Provisional Patent Application Ser. No. 63/116,763 titled "ADAPTIVE FILTER GENERATOR FOR IDENTIFYING COLUMN MARKER LINES AND TABLE MORPHOLOGY" filed Nov. 20, 2020, and U.S. Provisional Patent Application Ser. No. 63/264,292 titled "ADAPTIVE FILTER GENERATOR, IDENTIFYING LINES AND TABLE MORPHOLOGY" filed Nov. 18, 2021, the entirety of which are hereby incorporated by reference for all purposes.

BACKGROUND

The present disclosure relates to the field of document processing, specifically to the task of table structure recognition. In the area of computer-based platforms, data can be extracted from scanned documents, such as scanned images of invoices, purchase orders, packing slip, bills of lading, contracts, etc. Previous methodologies often rely on more static templates, lack of adaptive cycles, or expensive and unwieldy deep neural network approaches.

BRIEF DESCRIPTION OF THE DRAWINGS

FIG. 2D shows a table processed using a BVR filter.

FIG. 5 shows aspects of an ingestion process.

FIG. 9 shows aspects of a table optimization process.

FIG. 12 shows selected parameters and values.

SUMMARY

Figure 1:
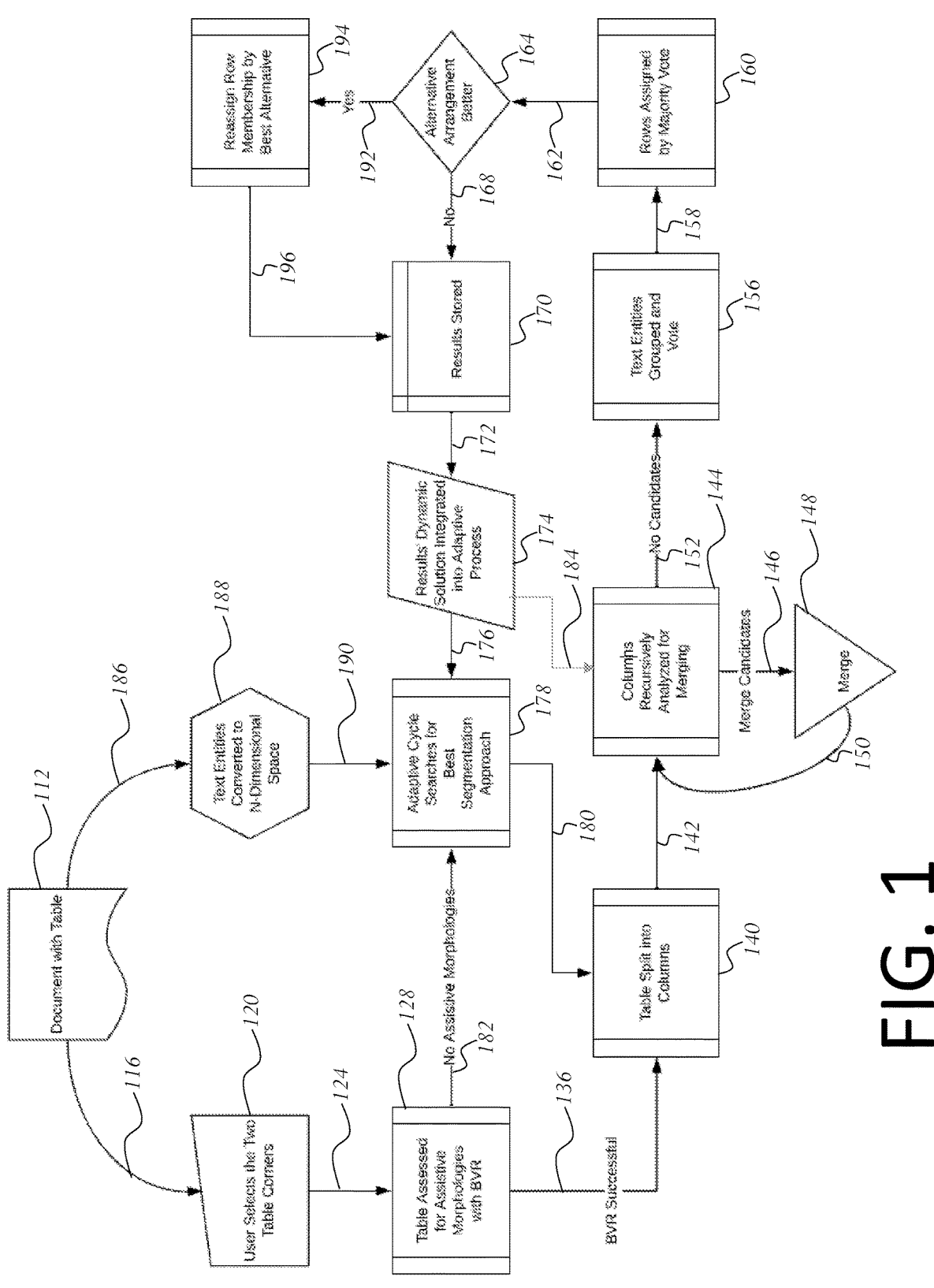
FIG. 1 is a flowchart showing disclosed method steps for improved table recognition, analysis, and image capture.

The systems, methods, and devices described herein each have several aspects, no single one of which is solely responsible for its desirable attributes. Without limiting the scope of this disclosure, several non-limiting features will now be discussed briefly.

In some embodiments, a system can comprise: a data store configured to store computer executable instructions; and a hardware processor in communication with the data store.

The processor, when executing the computer executable instructions, can be configured to: receive a collection of training document images and establish a filter for application to the training document images. This can be done by: providing an array with an odd number of index entries; assigning a sign to a center value for the array; assigning the opposite sign to two peripheral values for the array; providing array orientation for evaluating vertical and horizontal morphological structure in a document image; and providing at least one hyperparameter for the filter to allow for feedback and optimization of the filter structure over time. The processor can be further configured to convolve the filter with data in at least one of the training document images to create a processed image and evaluate the processed image to identify table structure. Convolving the filter can comprise orienting the array with the opposite morphology to vertical and horizontal features such that the index entries in the filter will, when convolved across a non-parallel feature of interest, interact sequentially with that feature in the training document images to produce a signal. The array can be initially convolved while oriented laterally to detect vertical lines and is then transposed and convolved while oriented vertically to detect horizontal lines. The hardware processor can be further configured to use the identified table structure and compare it to results from alternative segmentation approaches to identify and use the best results. At least some of the collection of training document images can correspond to real documents such that training occurs persistently using documents supplied by end users and the system provides results to end users concurrently with the persistent training. The hardware processor can be further configured to recursively evaluate table structure segmentation to improve results for a particular document. Recursive evaluation of table structure segmentation can be used to also improve results for a series of future documents and optimization accounts for a series of past documents, thereby preventing overfitting to a given document's particular style. The system can further comprise computer storage configured to accept quality quantifiers resulting from document processing and associate the quality quantifiers with one or more filter index values or hyperparameter values to determine one or more replacement values in an optimization cycle, resulting in filter evolution and aggregate improvement in initial document processing results for tables. In the described system(s), providing at least one hyperparameter can comprise providing one or more of the following: a size parameter comprising the size of a one-dimensional array; a multiplier parameter comprising a constant value that can adjust the magnitude of the column morphology response; an expanded center value comprising an operator for enlarging the center portion beyond a single index value; a ratio comprising the response between the center value and the peripheral values; a constant comprising an initial value for intermediate values between the center and peripheral values; and/or a threshold value comprising a value below which the system may ignore the filter response. Establishing a filter for application to the training document images can further comprise at least one of: multiplying a ratio hyperparameter by a peripheral value; multiplying all values in the filter array by a multiplier hyperparameter; and populating intermediate index positions with a constant as an initial value. The system can further comprise using the filter multiple times by convolving it with data in multiple training documents, comparing results from the multiple convolutions, and using these result comparisons to optimize by using new hyperparameter values to replace old hyperparameter values when better results are obtained. The central value can be negative and have an absolute value greater than ten, the peripheral values can be between one and three, and the intermediate values adjacent the peripheral values can be between two and ten.

In some embodiments, a system can comprise: a data store configured to store computer executable instructions; and a computing device in communication with the data store. The computing device, when executing the computer executable instructions, can be configured to: receive a collection of training document images and use the collection to train a convolution filter having index values and having hyperparameters corresponding to features of filter structure. The hyperparameters can comprise at least two of the following: a filter size corresponding to a number of index values in a one-dimensional array; a center expansion comprising an operator for enlarging a center portion beyond a single index value; a multiplier configured to adjust the magnitude of the filter response; a ratio characterizing response difference between center and peripheral values in the one-dimensional array; and a threshold comprising a value below which the system may ignore the filter response. The convolution filter can be configured for iterative training by obtaining silhouette scores for sequential sets of hyperparameters and accepting replacement hyperparameter values when higher silhouette scores are achieved. The convolution filter can be further configured for iterative training by obtaining silhouette scores for sequential sets of index and hyperparameter values and accepting replacement values for each when higher silhouette scores are achieved. The system can further comprise a monitoring apparatus configured to monitor end-user interactions and decisions with results from the convolution filter, thereby inferring actual table structure. The convolution filter can be further configured for iterative training by accepting the inferred actual table structure and adjusting index and hyperparameter values when actual table structure more closely matches processed results from the system. The hardware processor can be further configured to establish an initial version of the convolution filter by: providing an array with an odd number of index entries; accepting a sign for a center value of the array; and accepting the opposite sign for peripheral values for the array. The hardware processor can be further configured to convolve the array across a vertical or horizontal morphological structure in a document image such that the array has an elongate axis oriented across the morphological structure when convolved, thereby interacting sequentially with a non-parallel portion of a feature of interest. The hardware processor can be further configured to orient and convolve the array laterally to detect vertical column lines, transpose the array to orient it vertically and convolve the transposed array vertically to detect lateral row lines.

In some embodiments, a system can comprise: a data store configured to store computer executable instructions; and a hardware processor in communication with the data store. The hardware processor, when executing the computer executable instructions, can be configured to process scanned document files to identify table structure by: providing a modular and expandable algorithm architecture and convolving scanned document files using a numerical convolution operator comprising a symmetrical array. The operator can have: a center value; two peripheral values of opposite sign and greater magnitude than the center value; at least two intermediate values having a magnitude between the center value and peripheral value magnitudes and having the same sign as the peripheral values; and a line of symmetry corresponding to an expected direction of linear morphology in the scanned document files, such that the array is oriented to cross any such linear morphology. The operator can also have at least one hyperparameter defining the convolution operator structure, the hyperparameter configured to accept new values resulting from a feedback process as results from further scanned document files are evaluated. The processor can further identify table structure by using alternative column or line recognition processing algorithms and comparing results to determine the best solution, and using the best solution to establish a final processed data file that organizes tabular searchable content based on tables in the scanned document files. The values in the array can be configured to improve over time using feedback from previous results. The hardware processor can be configured to use a silhouette score to compare results to determine the best solution. The hyperparameters values can be configured to improve over time using feedback from previous results. The convolution operator can have a total number of five index values and the center value can comprises a pupil having a single value. The center value can have a magnitude at least seven times larger than the magnitude of either of the two peripheral values. The at least two intermediate values positioned adjacent and inward from the peripheral values can have magnitudes of less than two times the magnitudes of either of the two peripheral values. The central value can be negative and have an absolute value greater than five, the peripheral values can be between one and three, and the intermediate values adjacent the peripheral values can be between two and five.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of any appended claims).

In various embodiments, computer-implemented methods are disclosed in which, by one or more processors executing program instructions, one or more aspects of the above- and/or below-described embodiments (including one or more aspects of any appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of any appended claims).

DETAILED DESCRIPTION

Data extraction on documents, such as invoices, purchase orders, packing slip, bills of lading, contracts, etc., is a technically challenging task. It usually involves long processing times, labor-intensive processes, error-prone procedures, and high labor costs. In some organizations, some fields of interest, such as invoice number, purchase order (PO) number, dates, and dollar amounts can be manually examined and entered. Existing template-based Optical Character Recognition (OCR) and/or rule-based Named Entity Recognition (NER) can be slow, expensive, and/or inaccurate. These existing techniques are typically designed for limited document types, content layouts, and field formats.

Accordingly, improved data extraction techniques described herein can process a high variety of document types, content layouts, and/or field formats with greater accuracy using artificial intelligence, and, in particular, machine learning.

Optical character recognition and related document extraction processes do not often recognize or address tables properly or efficiently. Thus, an initial problem can be how to extract table structure from table text. In other words, given an optical character recognition ("OCR") file and/or an image of a document intending to present a table, how can rows, columns, header values, etc. be structured into a corresponding table? The present disclosure addresses these problems. A starting point can be to accept processing results indicating there is a table (or to assume there is a table), but the only thing known about it is its borders such that its external limits are known, but not its internal structure. A method can use artificial intelligence (AI) or accept user input to identify a box bounding the table (which, in one efficient approach, can be achieved by a user tapping or touching a top left and a bottom right corner of the table, for example). Each tap can represent an extreme in two dimensions, allowing four boundaries to be interpolated from only two locations.

A method can then "ingest" or identify text that has been scanned or recognized in between those locations, assuming that all such text forms part of the table. That ingested text can then be organized, or assigned a structure, using a multi-prong approach. One prong can include searching for table indicia or morphology such as vertical lines. A specialized line detector or algorithm described further below for such a task is the Beery Variant Ring difference filter (BVR). This and similar modules can be customized and accept continual improvement through parameter adjustment, feedback, and machine learning, for example. Tunable parameters in the BVR allow for optimization. Machine learning and/or parameter optimization can occur both locally (finding the best fit from several alternative algorithms for a given table instance) as well as globally (storing historical results and fine-tuning a parameter starting point for all documents or all tables—especially those from the same source or having initial indicia of similarity through other means). This provides for a dynamic approach. For global optimization, user input can be provided based on the final outcome of a task. Good performance can be reinforced (e.g., saved for later use), and poor performance can be discarded or disfavored—often resulting in continued searching for a better parameter set.

Multiple layers can be deployed in an algorithm. A first, computer vision layer can be used when the BVR detector is applied, for example. A feedback loop can also be used, where Bayesian optimization provides feedback (e.g., persistent or continuous feedback).

In a post-processing flow, once a detector has been applied, rows and columns can be applied, and iterative corrections made, if needed. An algorithm can emphasize or prefer the most table-like grouping or entity that results from various options. Post processing steps can learn, similar to the detector. Thus, a post-processing system can be optimizable. Optimization can occur as parameter values are given higher weights if they correspond to preferred row and column structures. If better bounding boxes are established through this feedback, they can be preferred. This is different from typical post-processing, which tends to rely on fixed rules rather than optimization.

To further the iterative and machine learning process, final results can be produced to a system user or customer. Customer reaction can be monitored and feedback from this process can also be integrated back into the system. For example, if a user makes a change (such as by marking different table boundaries), this can feed back into the system.

Examples and more detailed flows that are generally consistent with this overview are provided below. The optimization and feedback steps are generally represented below and in the figures with cyclical loops, where feedback is shown with arrows that form a loop or a potential loop between boxes, steps, or entities. For example, in FIG. 1, arrows 150, 180, and 184 show feedback processes.

A useful goal for table structure recognition in document processing is this: given a number of textual entities present in a table or table-like structure, assign an order to them that best represents the actual column-row structure of the table. Prior art typically suffers from one or more of the following problems: (1) inability to detect the location of a table within a document (table detection); (2) a cascading error effect caused by partial table detection and partial column-row detection; (3) reliance on white space between columns and rows to indicate proper membership; (4) ineffective filter mechanisms for detecting table morphologies; (5) lack of post-processing to refine initial results; (6) insufficient resources and lack of data to train an end-to-end deep learning model; (7) no flexibility or adaptability during processing dependent on invoice structure; (8) use of templates which do not work for any new inputs. The present disclosure addresses extant problems in the field of table recognition, especially those listed above, by creating a versatile, adaptable, unsupervised and novel table recognition algorithm.

FIG. 1 helps illustrate how 8 major components/processes can be used in combination to address the goals and benefits described herein.

1. Table Detection Using a Subject Matter Expert

In an initial circumstance 112, a document with a table is provided. As shown with arrow 116, another step can follow. A user can participate 120 (e.g., by selecting two table corners). This stage of the table recognition process can treat the user as a highly-motivated subject matter expert capable of identifying the location of a table within a document. For example, two clicks are made on a document to indicate the upper left corner of a table and the bottom right corner of the table. Using these two coordinates, a bounding box can be constructed around the table area of interest. Other methods of bounding, indicating, or recording data in an algorithm a starting point for recognizing a table may also be used. For example, different corners like lower left and upper right can be indicated, virtual boxes can be drawn (e.g., dragged), a center point can be indicated, top and/or bottom of columns can be selected or indicated, etc.

2. Conversion of Text Entities into Euclidean Spatial Coordinates or any n-Dimensional Representation A table recognition algorithm can proceed in a modular fashion. The architecture of an example system allows any user-specified dimensional measure to be applied to the textual entities. For example, the user might specify that the center of a textual entity is to be used to compare similarities, or the user might specify an advanced series of relationships resulting in a 6-dimensional representation of the position of each textual entity. The modular nature of this architecture allows for flexibility in deployment across any possible number of document domains.

The software architecture can include a single function that accepts textual entity descriptors and a transformation function. As indicated at box 188, the return value can be an n-dimensional array, matrix or tensor that can be used to draw relationships between textual entities.

3. Assessment of Assistive Table Morphologies

With further reference to FIG. 1, as shown with arrow 124, another step can follow step 120. As shown at step 128, an algorithm can assess a table for assistive morphologies with BVR (explained further herein). An assistive morphology may be a line intended to separate, distinguish, or border columns in a table, for example. One highly useful part of this methodology is the use of the (working name) Beery-Variant RDF (BVR). During initial research, the ring difference filter was investigated as a potential candidate for edge detection, thus the "RDF" moniker. The current approach however bears little to no resemblance to the original RDF publication (Surh et al., Noise Robust Depth from Focus using a Ring Different Filter, available at https://sunghoonim.github.io/assets/paper/CVPR17_RDF.pdf) and the naming convention is only a carryover artifact. The BVR is an adaptable, customizable filter generator that allows for continual improvement and adjustment for the identification of column marker lines. When convolved across a 2D image, it is capable of identifying and accentuating regions where vertical column lines are present.

Figure 2A:
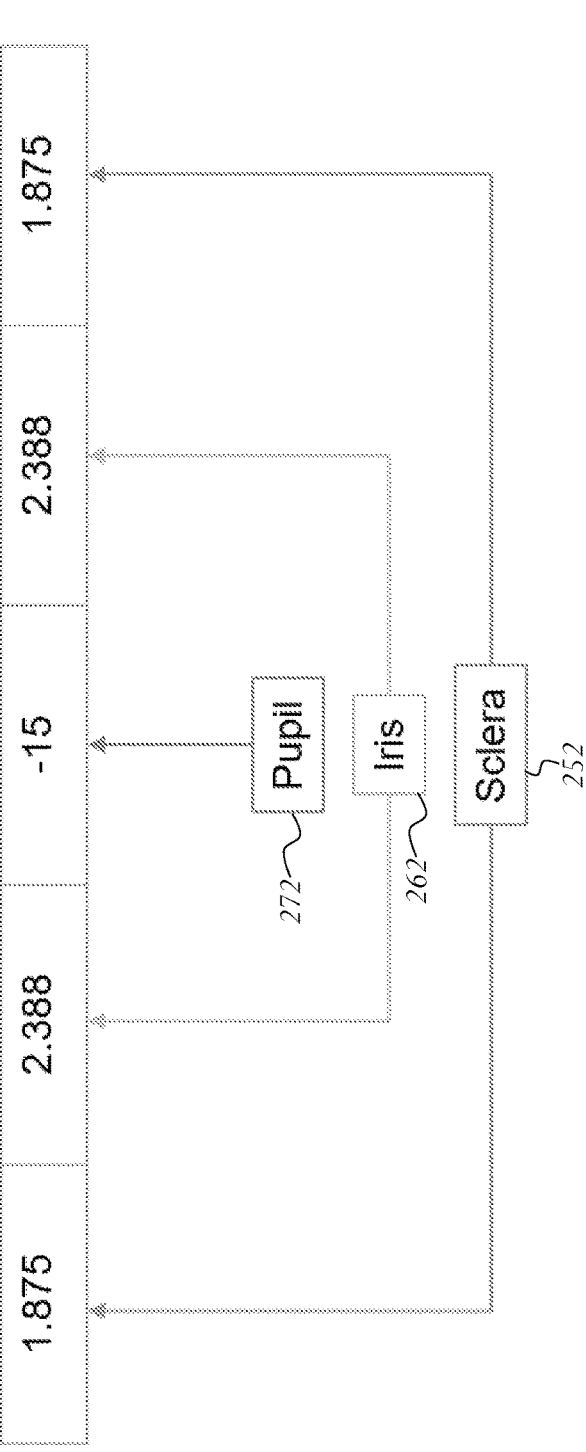
FIG. 2A shows an example BVR filter or operator.

Referring now to FIG. 2A, the BVR can be a 1-dimensional array having a sclera 252 (the values on the extrema of the array, illustrated as 1.875), an iris 262 (the central, adjustable values of the array, illustrated as 2.388) and a pupil 272 (the middle value[s] of the array, illustrated as −15). Examples of specific array values or parameters are shown in FIG. 2. The numbers shown for the 1-dimensional array are only examples. The value for a pupil can be positive or negative, but should be the opposite value of the sclera. The center and outside values are opposite so that they mathematically create different responses over an image which makes detecting morphologies easier.

Software implementation of the BVR can use 6 primary hyperparameters: (1) Size—The size of the 1D array. In some implementations, this size is preferably odd-numbered, allowing it to have a central pupil and symmetrical iris and sclera portions. (2) Multiplier— A constant value that can adjust the magnitude of the row or column morphology response; (3) ECV (expanded center value)— Whether or not to dilate the pupil beyond the pixel of interest during convolution; (4) Ratio—The ratio of the response between the pupil and the sclera; (5) Constant— A constant value that when supplied can become the default value of the sclera region; (6) Threshold— A threshold below which the BVR response may be ignored.

4. BVR Development and Design

The BVR is a procedurally generated computer vision filter based on hyperparameters listed above (e.g., size, multiplier, ECV, ratio, constant and threshold). The filter can be applied to computer files representing grayscale images and is particularly effective at sharpening and/or identifying table morphology such as vertical or horizontal lines straddled by white space. The following provides an example development and use of BVR.

Figure 2B:
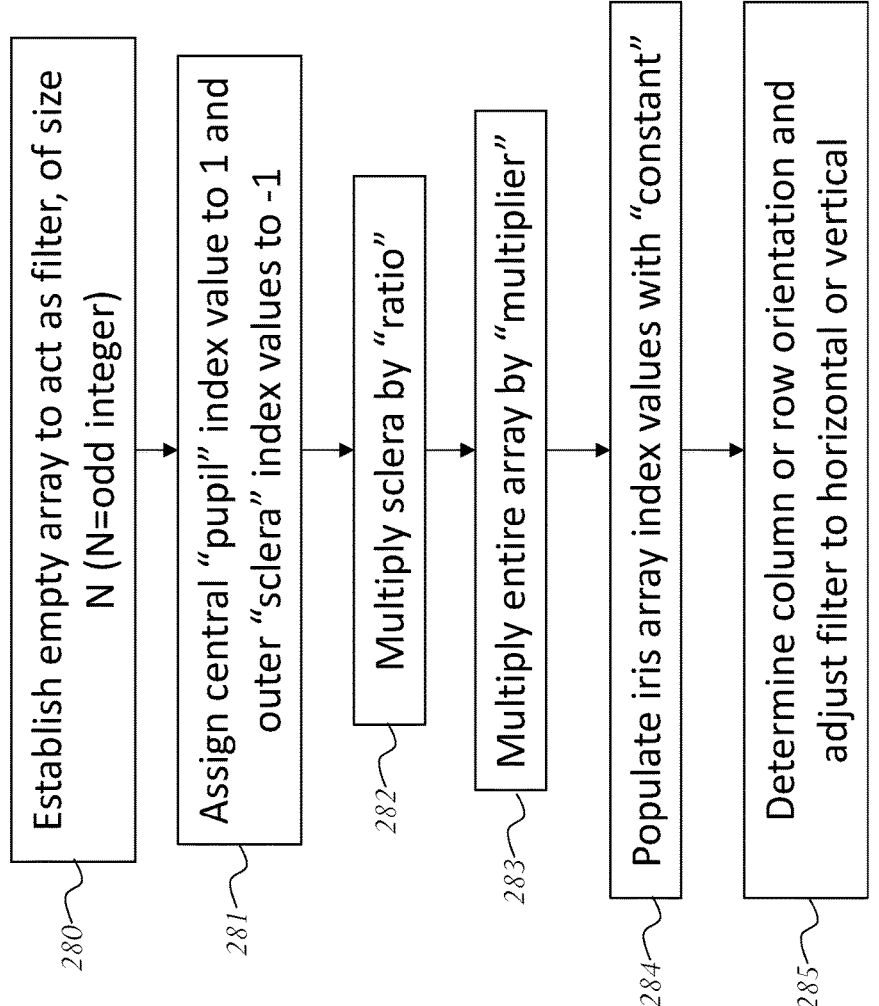
FIG. 2B shows an example process for initially providing a BVR filter.

With reference to FIG. 2B, first, a filter can be created in computer memory by establishing 280 an empty (0-valued indices), single-row array of a selected size (hyperpameter size). For example, FIG. 2A shows an array of size 5 (meaning it has five positions, from left to right). Note that other sizes are also possible, including the size of 9 in the "BVR size" row in FIG. 12. Advantageously, the size is an odd number such that a central pupil can be surrounded by symmetrical iris and sclera in the wings. Regarding the index values, FIG. 2A shows different values (1.875, 2.388, −15, etc.) Initially, however, such an array can have an index value of zero at each of the five positions.

Next, the outer index values of the sclera 252 (see FIG. 2A) are assigned 281 a value of −1 and the pupil is assigned a value of 1. By using these values, this filter is designed to produce a significant response magnitude when the center and edges of the filter are applied to (e.g., convolved with) different pixel intensities. This is useful for recognizing when the filter passes over a narrow black line in an otherwise white area of a scanned document, for example. Thus, for example, when the pupil passes over (e.g., is convolved with) a vertical black line, but both symmetrical right and left edges are passing over white space, the signal response can be enhanced. The integer one was chosen because arithmetic operations can be efficiently performed from this basis.

An expansion parameter can be Boolean (have possible values of 1 or 0, for example). In some embodiments, if the hyperparameter "ECV" (also known as "BVR Center Expansion" in FIG. 12) is 1 (indicating an expanded state), a further constrain requires that the pupil occupy a space (a number of indices or filter locations) equal to the size divided by 3. However, in a default or original, non-expanded state (corresponding to ECV=0), the pupil size is 1 (a single central index value). FIG. 2A illustrates a non-expanded pupil occupying a single index or filter location and an overall filter size of 5. If non-expanded (0), a pupil is only one value wide. If expanded (1), a further constraint requires that the pupil occupy ⅓ of the overall size. As shown by the zero values for ECV in FIG. 12 and the pupil size in FIG. 2A, an optimized or highly refined version of a convolution filter in accordance with the present disclosure has learned to prefer not to expand the center of the filter.

The sclera is then multiplied 282 by the "ratio" hyperparameter (e.g., the "BVR Value Ratio" of FIG. 12, with values showing as 0.9, 1, and 0.25). This changes the magnitude of response between the pupil and the sclera, tuning the relative relationship between them. A crude analogy can be made to a magnifying glass or microscope as it scans the surface of a document, with the ratio hyperparameter in this analogy acting similar to the focus ring of a microscope.

The entire array is then multiplied 283 by the "multiplier" value (which under a microscope analogy can be similar to the magnification power of microscope).

Finally, the iris array indices are populated 284 with the value assigned to the "constant" hyperparameter (in FIG. 12, three such values are shown: −5, −3.3, and 2.4). Applying this constant helps predictably control the gradient between the iris and sclera and allows an intermediate, non-extreme response prior to the more extreme and opposite response of the pupil during the convolution process.

Figure 3:
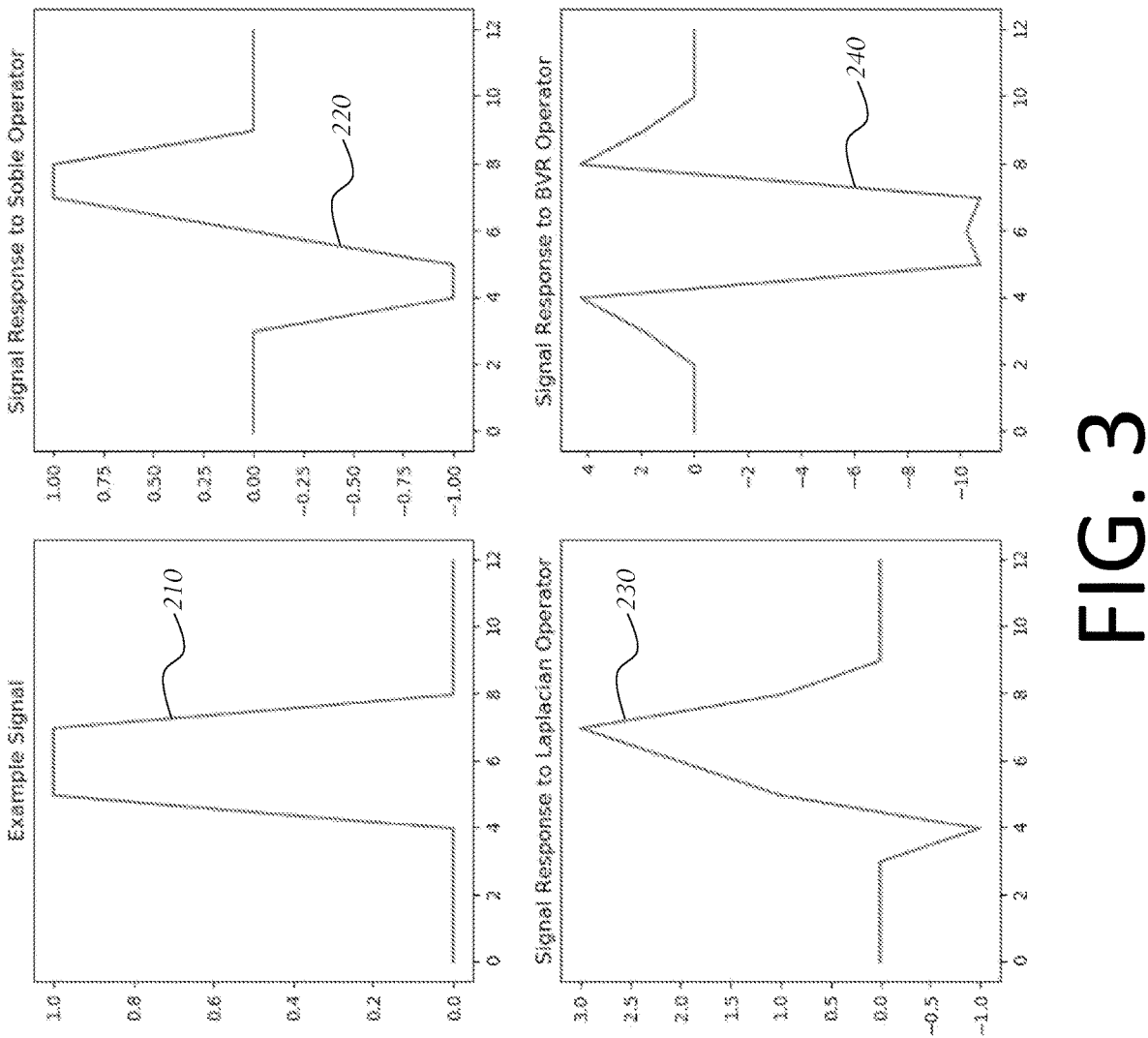
FIG. 3 compares signal performance of disclosed methodologies in a signal which mimics a 1-D column line.

In a process of determining orientation 285, if the BVR is applied to columns, the filter shape is a horizontal 1 row by 5 column (1×5) filter (see FIG. 3). If the filter is applied to rows the BVR is a 5 row by 1 column (5×1) vertical filter.

The resulting filter (after the steps outlined above and in FIG. 2B such as adding the constants, deciding orientation, etc.) is then convolved across an image (e.g., 8-bit grayscale image is common and efficient to use) using a two dimensional convolution operation (e.g., scanning left to right, top to bottom across the array of image pixels). Using machine learning, many such convolutions across many data sets having many signals corresponding to table lines can result in feedback that improves the array values and hyperparameter values. FIG. 12 shows three different value sets resulting from varying time periods (initial, eight months, and one year) of machine learning and optimization.

Because this filter is procedurally or automatically generated (e.g., starting from the standard, machine-learned hyperparameters), changes to the filter and the effect it has on tables can be performed computationally—and further optimized computationally—without the need for human intervention. The BVR's hyperparameters shown in FIG. 3 have gone through several optimization routines and have changed (see FIG. 12) from preferring large BVR sizes (e.g., 9) with large ratios (e.g., 0.9 and 1) to more compact sizes (e.g., 5) with low pupil-iris ratios (e.g., 0.25). The results show a highly optimized filter capable of generating strong, consistent signals to table lines over other filter types.

Figure 2C:
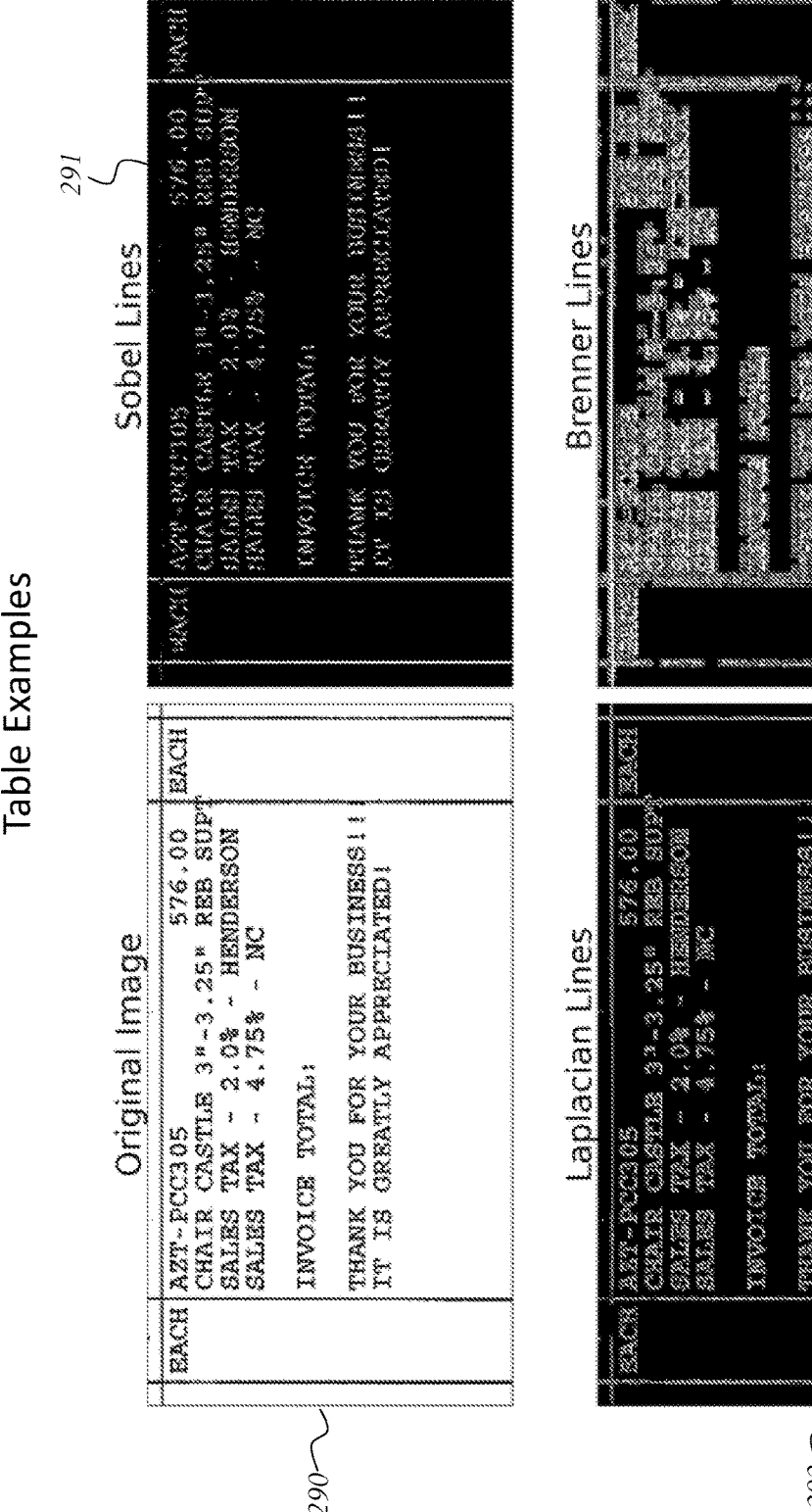
FIG. 2C shows examples of a table processed using different filters.

FIG. 2C shows example tables scanned using other filters. The original image 290 includes a table. The figure shows processing results 281 using a Sobel Lines filter 281, processing results 282 using a Laplacian Lines filter, and processing results 283 using Brenner Lines filter. These results show fuzzy, inconsistent, weak signals.

FIG. 2D shows the same example table 290 as processed using the BVR filter 294. The BVR processing and filter results in strong, consistent responses across table lines that can be used for table recognition tasks more easily.

4. Division of Table into Columns

With further reference to FIG. 1, as shown with arrow 136, another step can follow (for example, if BVR of step 128 was successful). As shown at step 140, a table can be split into columns. A BVR filter (explained elsewhere herein) can be used, and its results can be compared to results from other methods. In the absence of discrete table column markers, the algorithm is able to adaptively cycle through alternatives based on white space, user-specified functions or textual coordinate similarity, for example. The system can integrate and use other solutions, automatically evaluating results as it goes. Other solutions are described, for example in a survey paper by Zanibbi et al., A Survey of Table Recognition: Models, Observations, Transformations, and Inferences, Oct. 24, 2003, available at (http://citeseerx-.ist.psu.edu/viewdoc/download?doi.10.1.1.7.2251&rep=rep1&type=pdf). The described system is "modular" and can easily swap out or integrate other algorithms/models. For example, a layout analysis 1126 is described with respect to FIG. 11. Additional analyses can be provided in parallel with 1126 and 1132 of that figure, for example.

This process is further described in part 7. After an improved (e.g., the ideal or a favorable) column division process is identified, textual entities within the table are segmented into discrete membership groups by their position within column boundaries.

5. Column Characteristic Analysis and Merge Algorithm

With further reference to FIG. 1, as shown with arrow 142, another step can follow step 140. At step 144, columns can be recursively analyzed for merging. It is not uncommon that although a textual entity may reside primarily within a single column's boundaries, it significantly overlaps with another column. The algorithm at this point can provide a series of metrics for decision making: (1) amount of overlap between columns; (2) nature of the overlap (zippered, inconsistent, unrelated, etc.); and/or (3) ratio of textual entities overlapping. Based on these (or similar) metrics, candidate columns (see arrow 146) may be merged or kept separate (see step 148). The algorithm can then recursively apply a solution (see arrow 150) until no more column merges are detected, or until no further qualifying candidates are available or presented (see arrow 152).

Recursive merging can help improve results. For example, a recursive column merging stage can use optimizable thresholds relating to metadata about columns' relationships to each other. Major thresholds applied can include (1) Jitter, or how much variability is allowed to consider column text left, right or center-aligned; (2) Overlap, or how much overlap is significant enough to consider two separate columns as a single entity; and/or (3) Zipper, or many rows between columns can alternate overlapping patterns and be considered separate entities. The metadata gathered by the system to compare against the threshold can include: (1) standard deviation of two columns' contents' left, right and center coordinates; (2) percentage of horizontal overlap between two columns' content; and (3) percentage of items from column 1 overlapping column 2 as a ratio of column 2's items overlapping column 1's. During system optimization During system optimization (see FIG. 10), these thresholds are optimized or enhanced to perform well or better across all samples seen by the system.

6. Majority-Vote Row Assignment

With further reference to FIG. 1, as shown at step 156, text entities can be grouped into "votes" or rows. For example, the final column assignment can be used to determine the nature of row segmentation. For example, textual entities can be grouped into similar clusters called "lines" and each line can be considered a voting entity within a column. In a subsequent step (see arrow 158), each column can have its total votes tallied and the median number of votes can be used to assign row membership by fitting all textual entities into the predetermined number of groups. Thus, as shown at step 160, rows can be assigned by majority vote, for example. Other methods of row assignment can also be used, using some or all of the parameters described here.

7. Consideration of Alternatives

With further reference to FIG. 1, as alluded to earlier, one of the components of this methodology is the adaptive cycling of alternative considerations. For example, at step 178, an adaptive cycle can search for a best segmentation approach. Although preference may be originally given to one method (white space, column markers, position, etc.), the selected solution is still compared against the theoretical outcome of the other methods. The results are quantitatively analyzed with preference given to more table-like structures and the best performing method is propagated forward in the algorithm. For example, as shown with arrow 162, following a row assignment 160, an alternative arrangement 164 may be better (192), in which case row assignment occurs (194) by the better alternative, and following this (196), the results may be stored (170). Following this (172), the results of this dynamic solution can be integrated into the adaptive process (see step 174 and arrows 176, 180, and 184), so the cycle can search for the best segmentation approach (178).

This alternative analysis can occur for both columns and rows. Thus, after step 178 (see arrow 180), a table can be split into columns (14) in an alternative manner and the process can iterate (arrows and steps from 180 to 140 and back to 176, or from 184 to 144 and back to 172). The adaptive cycle can also be scale and ratio invariant, meaning that regardless of the resolution of the table, the size of the rows/columns and the aspect ratio of the image, performance is comparable across all variations. For example, documents may have multi-dimensional tables (e.g., having more than rows and columns). After such a document (112) is provided (186), text entries can be converted to N-dimensional space as shown at step 188. The adaptive cycle (178) can follow (190) and iteration can occur for each of the N dimensions and any related sub-dimensions. Sub dimensions can occur with because, for example, rows may depend on a column merging analysis as noted above.

8. Feedback Storage for Continual Updating

The results of the table can be manually corrected or accepted as they are. For example, after a certain number of iterations or a particular quality or numeric threshold has been met, a user can be queried or presented with one or more options. If provided, a decision of the user can be considered the ground truth as they are the most motivated party to ensure success of an automated table recognition system. The final results can then be stored (see step 170 of FIG. 1) along with metadata about the document and the table structure characteristics. As the system gathers more information, the method can utilize machine learning to preempt not only table recognition, but also table detection in documents that are highly similar to previously seen entities.

Advantages

The approaches described here have many advantages. For example, by using the user's input for table detection, the algorithm can assume that textual entities present within the specified coordinates are members of a table or table-like structure. This can reduce or eliminate uncertainty surrounding table detection and focus on extracting relevant information. By utilizing the user's input, it significantly reduces the possibility of cascading errors between the detection and recognition phases for tables. The adaptive methodology described herein circumvents the reliance on white space by constructing novel methods of column segmentation as well as developing an adaptive cycle approach to selecting the best method on a document-by-document basis. It also adapts to circumstances in which overlapping columns cannot be separated by white space identification.

The BVR filter is a robust and versatile operator that far exceeds existing morphology detection filters. While most filters are designed to look for edges, the BVR filter produces strong activations in the presence of certain morphological entities like column lines. As explained above, this stems in part from the initial design of symmetry, etc. as explained above. However, it also results from empirical, machine-learned experience in developing and optimizing parameters in a continual process of feedback and experience. Many iterations of experience are represented in the parameter values shown in FIG. 2A and FIG. 12, for example.

FIG. 3 shows the superior performance in a signal which mimics a 1-D column line. An example signal 210 is shown having a magnitude of 1. Such a signal can exist in a grayscale document file when a lateral portion of a document is scanned from left to right, for example, and that particular portion contains initial blank or white space (e.g., corresponding to the flat portion, numbers 0 to 4 on the X axis of the top left plot labeled "Example Signal"), then a portion of a thin vertical line that may form part of a table border (e.g., corresponding to a dark, inked portion at numbers 4 to 8 on the X axis), then a subsequent blank space (e.g., corresponding to numbers 8 to 12). In this figure, Y axes can represent filter response magnitude, while X axes can represent pixel or signal positions.

A signal response to a Soble operator 220 is shown having an absolute value magnitude of 2. A signal response to a Laplacian operator 230 is shown having an absolute value magnitude of 4. A signal response to a "BVR" operator 240 is shown having an absolute value of approximately 14. A BVR filter or operator structure can be reflected when it is convolved across a signal, such that the signal response 240 can help visualize a BVR operator itself.

Given the superiority of the BVR filter for the presently described table processing, some embodiments of a system do not waste computation time evaluating the Laplacian or Soble operators, but instead use only the BVR operator for an initial pass. However, as described herein, alternative (non-signal-based) approaches can also be recursively evaluated. The use of alternative recognition comparisons and the presence of column merge ambiguity resolution creates a fluid and adaptive methodology for table recognition. Described systems and methods can be agnostic to any particular technology or comparison. Such an open architecture can allow for plug-and-play usage of competing table recognition algorithms. For example, the approaches describe in the survey paper by Zanibbi et al. cited elsewhere herein can be used and contribute to optimization and parameter learning processes.

A system can evaluate column ambiguity merge resolution to decide when a column merge should occur. This can be done algorithmically or automatically using, for example, a silhouette score such as that described in Rousseeuw, Peter J., Silhouettes: A graphical aid to the interpretation and validation of cluster analysis, 20 J. of Comp. and App. Math at 53-65 (1987) (available at https://doi.org/10.1016/0377-0427(87)90125-7). A silhouette score can be used to verify that an improvement in this metric has been obtained by merging, for example. The threshold value for this score is set by the optimization procedure.

The system or method can be automated (e.g., generally unsupervised). It does not rely on any data for training or learning a function. Furthermore, as the algorithm is used, it begins to accumulate data and improve its capabilities as well as allow the development of new technologies. Because the methodology reassess its decisions at each stage and selects only the best performing process, it is adaptive to new documents and tables without the need for having seen similar examples before. Moreover, the methodology does not use templates and is therefore able to adapt to new inputs.

This disclosure, including the algorithm(s) and methodology described provide several key advantages over other technologies: (1) a modular architecture that allows integration of new components to further improve performance; (2) a novel BVR operator that outperforms existing filters in detecting critical table morphologies; (3) a cyclic, adaptive process that selects the best segmentation approach to new table structures on-the-fly; (4) a recursive process for column segmentation merging and refinement; (5) a mechanism for storage of the final results which also integrates final decisions into the adaptive cycle for future processing.

The disclosed approaches are in many ways better than a deep neural network approach because the latter typically would require an immense cost for data labeling and development.

9. Features

The following are among the features of the present disclosure: (1) use of 2-click human interaction to define bounding box of the table and conversion of OCR data into n-dim positioning for column-wise and row-wise assignment; (2) adaptive filter (working name: Beery-Variant RDF) for identification and assignment of column-like morphologies in tables; (3) adaptive cycle based column/row assignment detection to select best methodology for each table; (4) column overlap and merge detection post-processing for complex table structures; and (5) data storage and feedback mechanism for adaptive template predictions.

Figure 4:
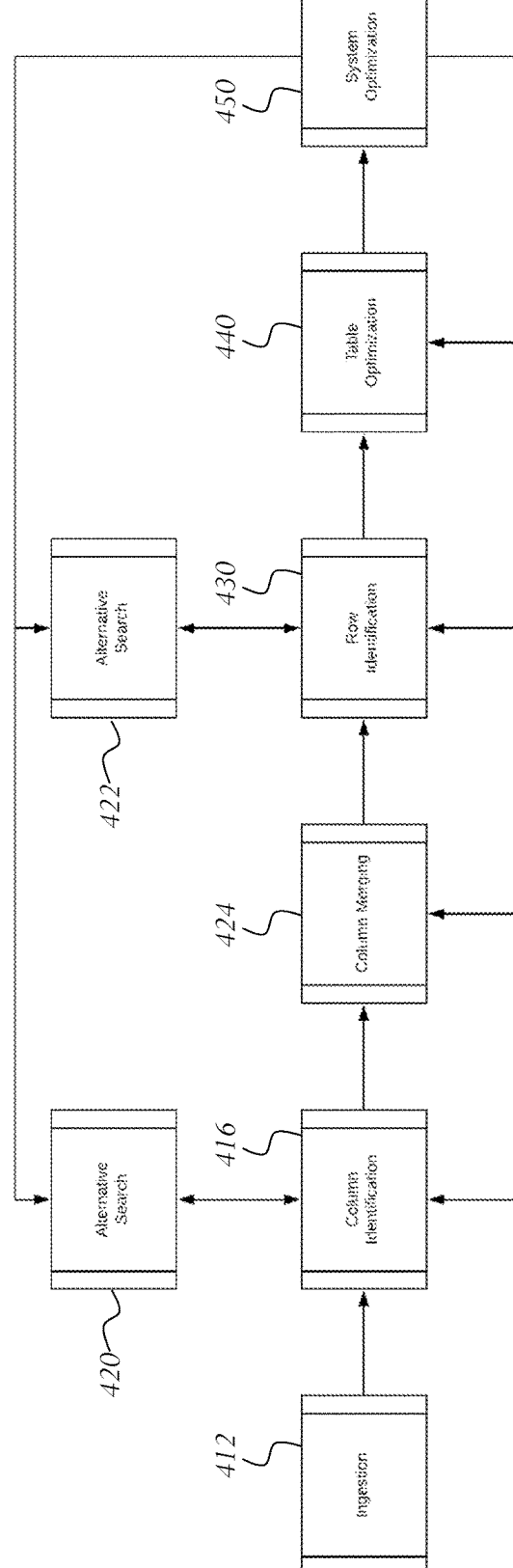
FIG. 4 is an overview flowchart showing how subsequent figures can relate to each other in a system or algorithm for table recognition, analysis, and image capture.
Figure 10:
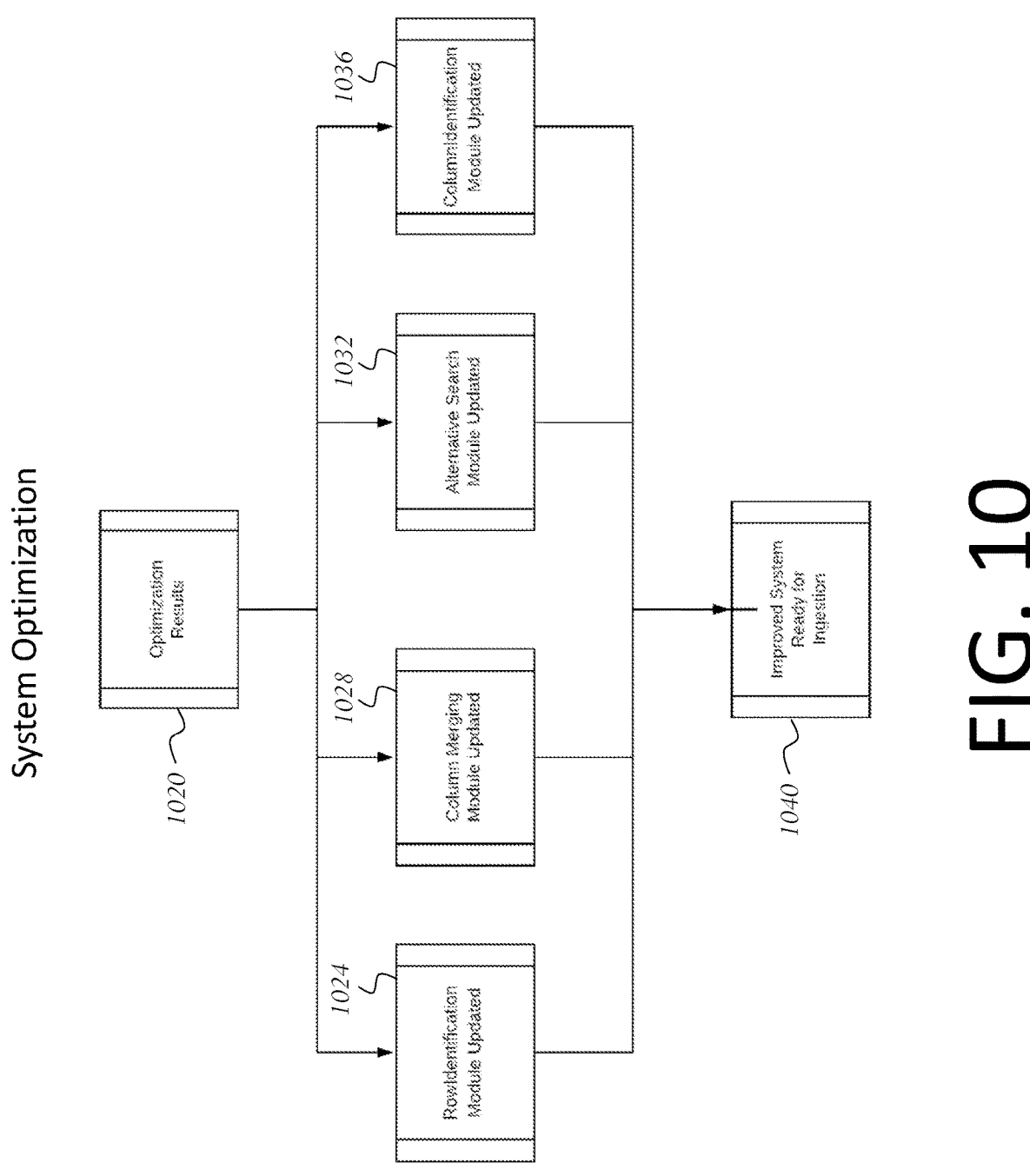
FIG. 10 shows aspects of a system optimization process.
Figure 11:
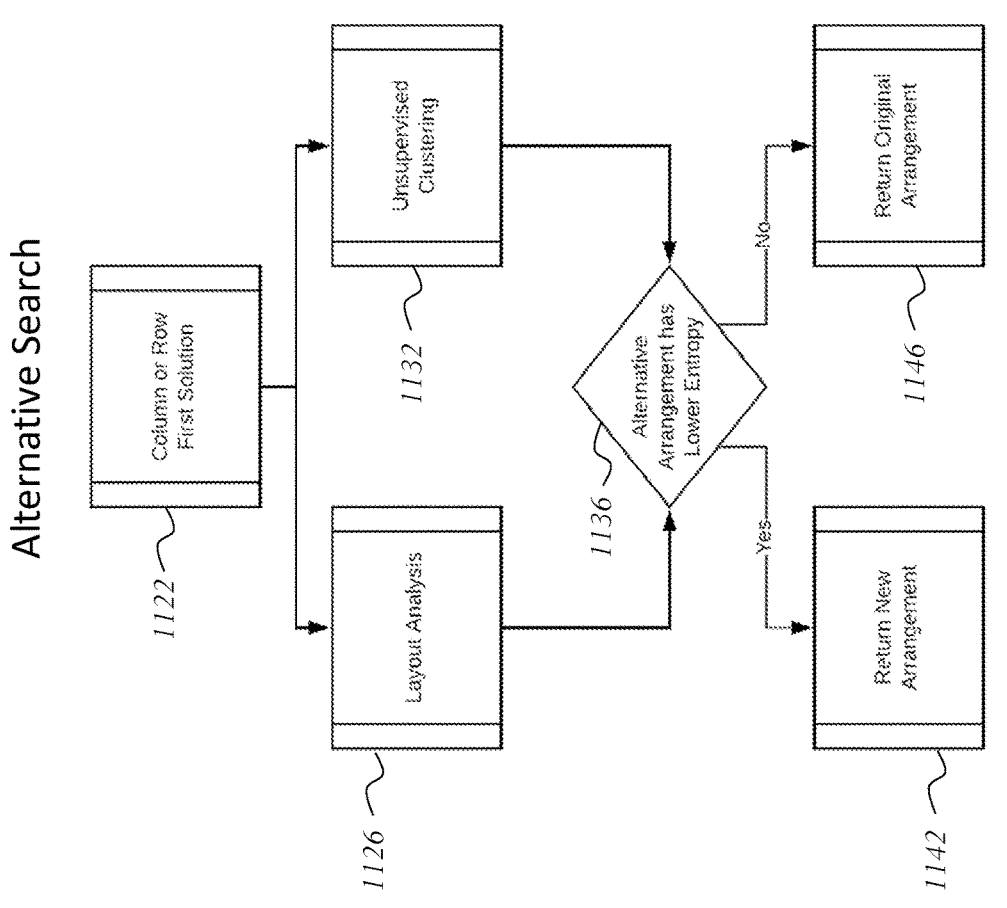
FIG. 11 shows aspects of an alternative search process.

FIG. 4 is an overview flowchart showing how subsequent figures can relate to each other in a system or algorithm for table recognition, analysis, and image capture. The overall flow of the system is as described by this figure. FIG. 1 is an alternative description of a system consistent with FIGS. 4-11. The first step 412 involves the ingestion of the input document detailed in FIG. 5. After ingestion, the column structure of the table is identified 416 through the BVR process (FIG. 6) and the alternative method search 420 (FIG. 11). The results of the column identification are passed to the recursive column merging procedure 424 (FIG. 7) where the column structure is refined before being passed to the row identification step 430 (FIG. 8). The row identification step 430 also uses BVR (FIG. 6) and the alternative method search 422 (FIG. 11). The row and column results are then passed to the table optimization stage 440 where the final table is constructed and compared against the ground truth structure (FIG. 9). The results of table optimization 440 are then passed to the whole system optimization step 450 (FIG. 10) where they are distributed to the column identification 416, column merging 424, row identification 430, table optimization 440 and alternative search 420, 422 steps. The system optimization stage 450 makes the appropriate changes to the above listed stage's parameters and functionality to optimize performance for the next ingested table.

FIG. 5 shows aspects of an ingestion process. Ingestion begins with the input of a digital document (e.g., which can be represented as an 8-bit unsigned integer grayscale image). The image is then fed in parallel to a neural network system that detects table boundaries 524. If the user is unhappy with the automatic boundaries, they can manually select the bounding box around the table. While this is happening, the document is also sent to an OCR engine 528 that provides data about the text in the image. The image, OCR results and the boundary information (represented as 4 coordinates (x1, y1, x2, y2—the upper left and bottom right corners or a rectangle). Are then passed to column identification 530 (FIG. 6).

Figure 6:
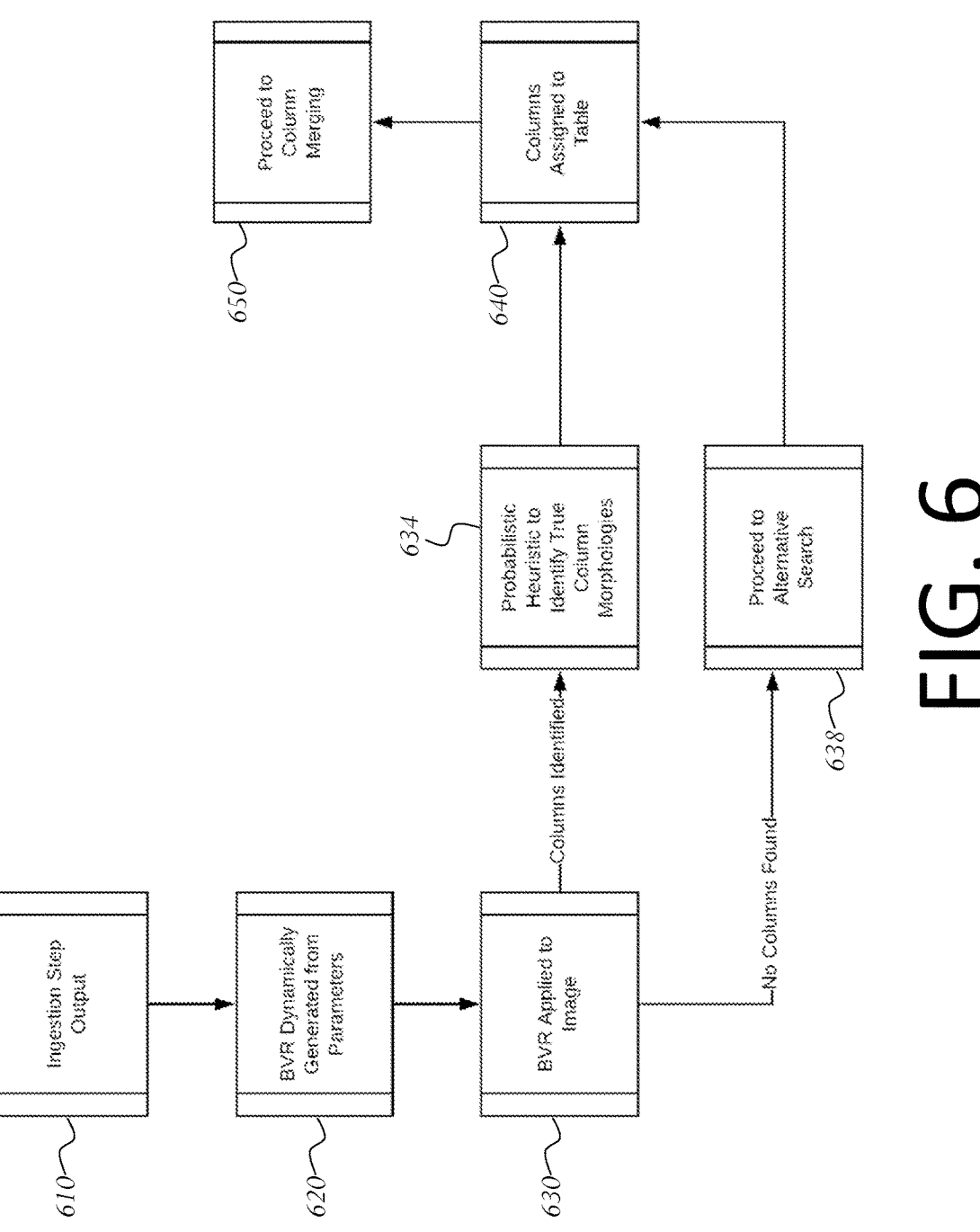
FIG. 6 shows aspects of a column identification process.

FIG. 6 shows aspects of a column identification process. Column identification accepts ingestion input 610 and begins with the procedural generation of the BVR 620 based on the already optimized hyperparameters. The filter is then applied to the image data 630 through a convolution step to identify column lines. If columns markers are identified, a probabilistic Hough line transform 634 can be used to determine the exact position and span of the lines. Using this positional information, the OCR data can be split into their respective columns 640.

In the event there are no column markers, an alternative search 638 (see FIG. 11) is performed and the OCR results are split into columns 640 based on those results.

Figure 7:
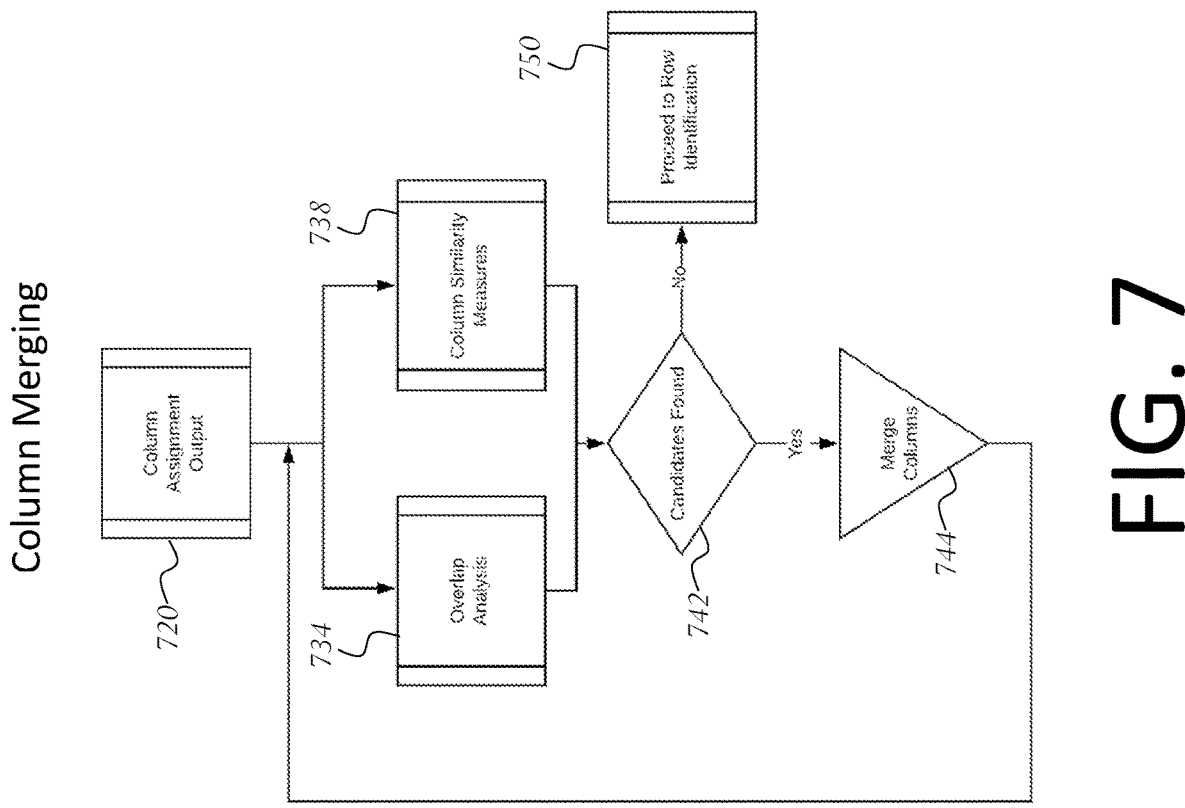
FIG. 7 shows aspects of a column merging process.
Figure 8:
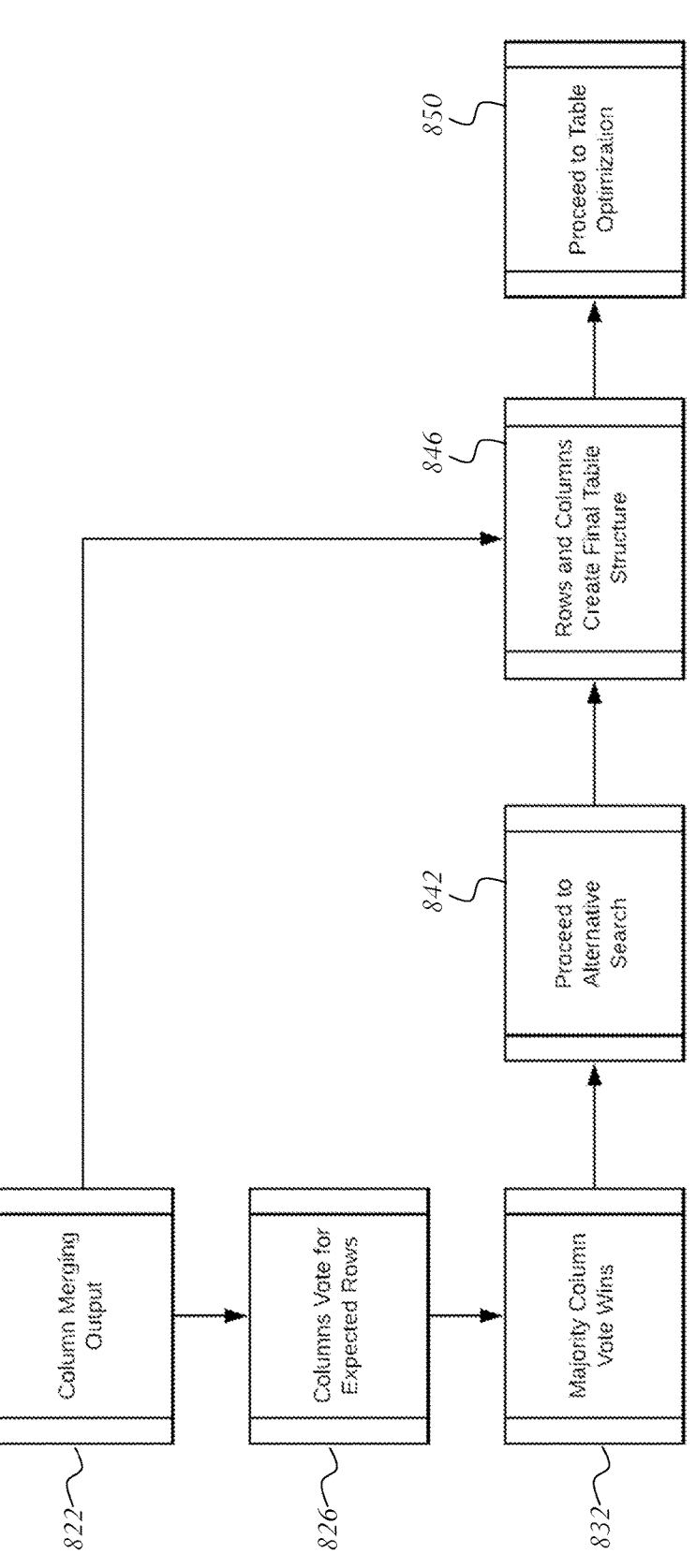
FIG. 8 shows aspects of a row identification process.

FIG. 7 shows aspects of a column merging process. The split OCR results from column identification 720 are passed into two main stages: overlap analysis 734 and column similarity 738. Overlap analysis 734 checks if column contents (as determined by FIG. 6) overlap significantly or overlap in a patterned, zippered way. The similarity measures 738 examine the possibility that the different columns are actually one by nature of their text sharing left-, right- or center-alignment. If either of these stages determines that two columns may actually be one 742 (based on an already optimized hyperparameter set of thresholds), the columns are merged 744 and the new column set is passed back to repeat the process. Once there are no more candidates for merging, the final column results go to row identification 750 (FIG. 8).

FIG. 8 shows aspects of a row identification process. The column results after merging 822 are used to divide the OCR data into groups by column. Each column votes 826 for the number of distinct line items present inside and the majority vote wins 832. For example, if 3 columns have 6 lines, 1 has 7 and 1 has 2, preference is given to creating a table structure based on 6 rows. Alternative approaches 842 are also measured (FIG. 11) and the best row identification results are then merged 846 with the column results to form a single table grid structure.

FIG. 9 shows aspects of a table optimization process. The final table results 920—as a grid structure—are used to calculate three separate metrics: row error 934, column error 938 and table error 942. The degree of correctness is determined by the adjusted Rand score which measures the similarity in content for each table cell as it compares with the ground truth content for that same table cell. The hyperparameters of the existing system and the error rates are passed to a Bayesian optimization function 948 that adjusts all hyperparameters of the system and re-evaluates performance. If the new parameters yield better results 952, then these new hyperparameters are sent to the system optimization stage 960 (FIG. 10). The Bayesian optimization function tries to balance exploring new combinations of hyperparameters while also exploiting its knowledge of what already makes for a good combination. Details of a Gaussian approach to this step are provided in Snoek et al., Practical Bayesian Optimization of Machine Learning Algorithms (available here: https://proceedings.neurips.cc/paper/2012/file/05311655a15b75fab86956663e1819cd-Paper.pdf).

FIG. 10 shows aspects of a system optimization process. When new hyperparameters are selected for improved performance, the system optimization stage 1020 is responsible for propagating this information to the rest of the system. Each hyperparameter is sent to its respective stage 1024, 1028, 1032, 1036 where it is utilized and the functions therein are updated to reflect the new hyperparameter values.

After all updates are finished, the system is ready to continued document ingestion 1040.

FIG. 11 shows aspects of an alternative search process. The results of column and/or row identification 1122 enter the alternative search and are compared against other possible methods of identifying the same. FIG. 11 shows how layout analyses 1126—such as white space, pixel histograms, character density, etc.—can be used as alternatives. Page 12 of Zanibbi et al. (referenced elsewhere herein) provides further details of optional layout analysis, also known as physical structure analysis, methods. Another alternative is using unsupervised clustering 1132 to assign columns and rows. Approaches like this can use text density as described in Ester et al., A Density-Based Algorithm for Discovering Clusters in Large Spatial Databases with Noise, KDD Proceedings (1996), pp. 226-231, available at https://www.aaai.org/Paper/KDD/1996/KDD96-037.pdf. The original solution, the clustering solution and any number of layout analysis solutions are then compared 1136 (e.g., by using a silhouette score to measure the entropy of the solution). If any alternative solution is better than the initial solution (as determined by a threshold parameter which is optimized by the table and system optimizations—see FIGS. 9 and 10) then the new solution is adopted and passed to the next stage of the system as shown at 1142. If not, the original arrangement is used as shown at 1146.

FIG. 12 shows selected parameters and values. This figure details some of the main parameters as optimized by an example system over the course of 16 months. An X Threshold parameter 1122 determines the aggressiveness of the alternative clustering algorithm used as an alternative solution (FIG. 11) for column identification. A Y Threshold parameter 1124 determines the aggressiveness of the alternative clustering algorithm used as an alternative solution (FIG. 11) for row identification. AlternativeEntropyX 1126 is the threshold for how much better a column solution must be than the initial solution in order to adopt the alternative as the final prediction. AlternativeEntropyY 1128 is the threshold for how much better a column solution must be than the initial solution in order to adopt the alternative as the final prediction. Intersection Threshold 1132 determines how many items from one column must overlap with another column to be considered as the same column. BVR Constant 1134 is used to initially populate the iris of the BVR filter with a uniform value. The constant serves to fill in the empty space between the sclera and pupil so that signal detection occurs in a more gradual manner rather than a sudden shift from the sclera values to the pupil. BVR Value Ratio 1136 is multiplied into the sclera to control the ratio of response between it and the pupil. For example, if the sclera has a 0.25 ratio, the magnitude of the pupil's response should be 4 times greater than one side of the sclera, or twice the magnitude if both sclera locations are activated at the same level. BVR Center Expansion 1138 is a Boolean parameter. If this parameter is set to 1, the pupil will occupy a space equal to one third of the filter's size. For example, if the BVR size is 9, the pupil will occupy the central three values of the filter. Otherwise (if non expanded or having a zero value), it will only occupy the central value. BVR Multiplier 1142 determines or can adjust the magnitude of the row or column morphology response. Large multipliers generally create the most salient responses, but if the response is too large it can fail to be captured by an image's 8-bit precision. The multiplier is balanced by the Ratio to prevent the pupil response being too large compared to the sclera.

The Binarization Threshold 1146 also operates alongside the BVR Multiplier 1142 to find at what magnitude the response is considered a true morphology in the table. BVR Size 1144 sets the number of values in the BVR filter. A size of 9 will have a filter with 9 values, while a size of 5 will have a filter with 5 values. BVR Binarization Threshold 1146 determines candidate pixels for table inclusion; based on the magnitude of response from the BVR filter, any pixels from the image that are above this threshold are considered candidates to be part of a row or column line.

10. Example Computing System

Figure 13:
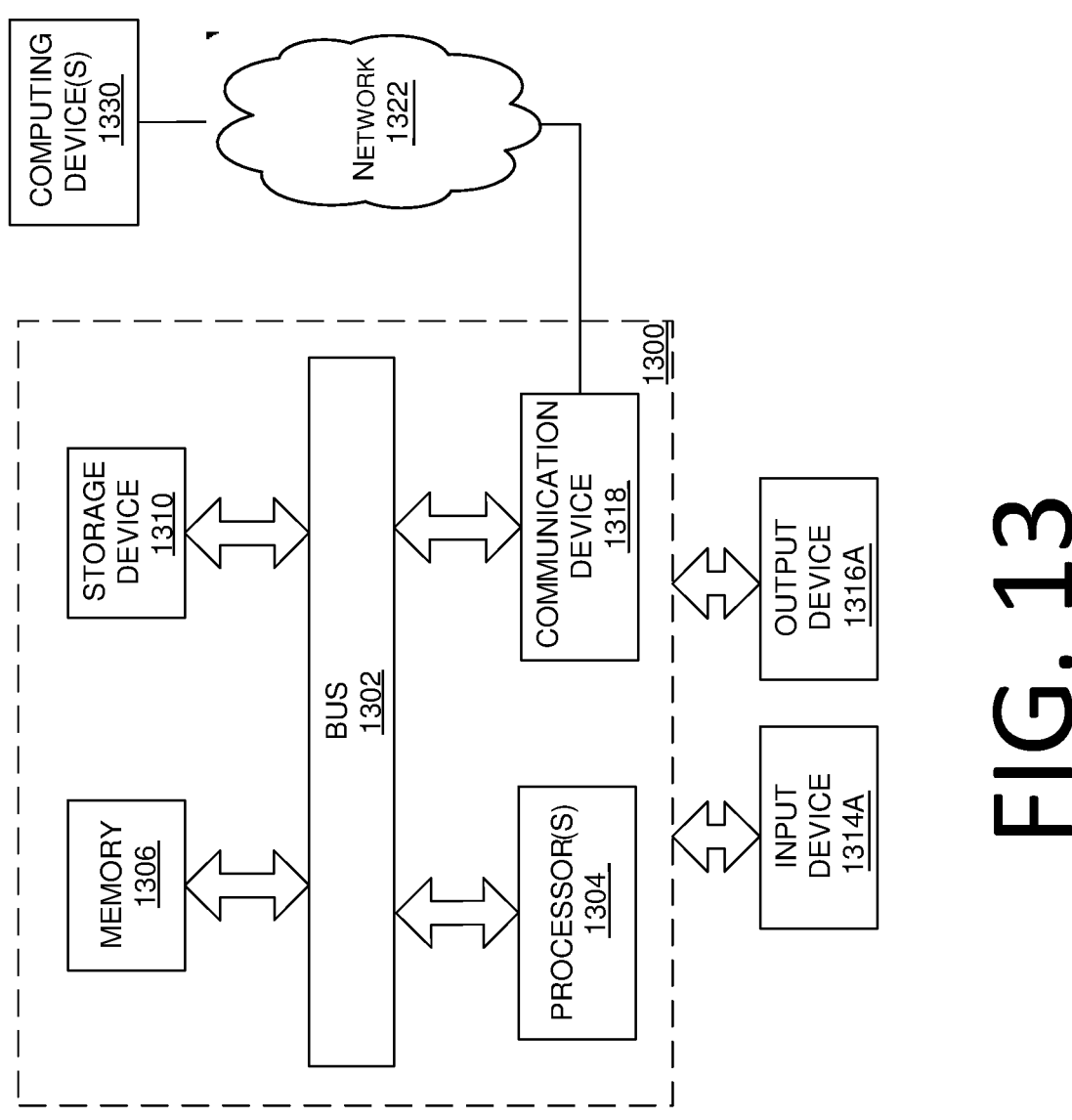
FIG. 13 shows an example computing system.

FIG. 13 depicts a general architecture of a computing system 1300. The computing system 1300 or components of the computing system 1300 may be implemented by any of the devices or components discussed herein. The general architecture of the computing system 1300 depicted in FIG. 13 includes an arrangement of computer hardware and software components that may be used to implement aspects of the present disclosure. The computing system 1300 may include many more (or fewer) elements than those shown in FIG. 13. It is not necessary, however, that all of these elements be shown in order to provide an enabling disclosure. As illustrated, the computing system 1300 includes one or more hardware processors 1304, a communication interface 1318, a computer readable medium storage device 1310, one or more input devices 1314A (such as a touch screen, mouse, keyboard, etc.), one or more output devices 1316A (such as a monitor, screen, or display), and memory 1306, some of which may communicate with one another by way of a communication bus 1302 or otherwise. The communication interface 1318 may provide connectivity to one or more networks or computing systems. The hardware processor(s) 1304 may thus receive information and instructions from other computing systems or services via the network 1322.

The memory 1306 may contain computer program instructions (grouped as modules or components in some embodiments) that the hardware processor(s) 1304 executes in order to implement one or more embodiments. The memory 1306 generally includes RAM, ROM or other persistent, auxiliary or non-transitory computer readable media. The memory 1306 may store an operating system that provides computer program instructions for use by the hardware processor(s) 1304 in the general administration and operation of the computing system 1300. The memory 1306 may further include computer program instructions and other information for implementing aspects of the present disclosure. In addition, memory 1306 may include or communicate with the storage device 1310. A storage device 1310, such as a magnetic disk, optical disk, or USB thumb drive (Flash drive), etc., is provided and coupled to the bus 1302 for storing information, data, or instructions.

The memory 1306 may also be used for storing temporary variables or other intermediate information during execution of instructions to be executed by hardware processor(s) 1304. Such instructions, when stored in storage media accessible to hardware processor(s) 1304, render the computing system 1300 into a special-purpose machine that is customized to perform the operations specified in the instructions.

In general, the word "instructions," as used herein, refers to logic embodied in hardware or firmware, or to a collection of software modules, possibly having entry and exit points, written in a programming language, such as, but not limited to, Java®, Scala, Lua, C, C++, or C #. A software module may be compiled and linked into an executable program, installed in a dynamic link library, or may be written in an interpreted programming language such as, but not limited to, BASIC, Perl, or Python. It will be appreciated that software modules may be callable from other modules or from themselves, or may be invoked in response to detected events or interrupts. Software modules configured for execution on computing devices by their hardware processor(s) may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, or may be comprised of programmable units, such as programmable gate arrays or processors. The modules or computing device functionality described herein are preferably implemented as software modules, but may be represented in hardware or firmware. Generally, the instructions described herein refer to logical modules that may be combined with other modules or divided into sub-modules despite their physical organization or storage.

The term "non-transitory media," and similar terms, as used herein refers to any media that store data or instructions that cause a machine to operate in a specific fashion. Such non-transitory media may comprise non-volatile media or volatile media. Non-volatile media includes, for example, optical or magnetic disks, such as the storage device 1310. Volatile media includes dynamic memory, such as the main memory 1306. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise the bus 1302. Transmission media can also take the form of acoustic or light waves, such as those generated during radio-wave and infrared data communications.

The computing system 1300 also includes a communication interface 1318 coupled to the bus 1302. The communication interface 1318 provides a two-way data communication to the network 1322. For example, communication interface sends and receives electrical, electromagnetic, or optical signals that carry digital data streams representing various types of information via cellular, packet radio, GSM, GPRS, CDMA, WiFi, satellite, radio, RF, radio modems, ZigBee, XBee, XRF, XTend, Bluetooth, WPAN, line of sight, satellite relay, or any other wireless data link.

The computing system 1300 can send messages and receive data, including program code, through the network 1322 and the communication interface 1318. A computing system 1300 may communicate with other computing devices 1330 via the network 1322.

The computing system 1300 may include or be implemented in a distributed computing environment including several computer systems that are interconnected using one or more computer networks. The computing system 1300 could also operate within a computing environment having a fewer or greater number of devices than are illustrated in FIG. 13.

11. Additional Embodiments and Terms

The various functionality described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A hardware processor can include electrical circuitry or digital logic circuitry configured to process computer-executable instructions. In another embodiment, a processor includes an FPGA, other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements or states. Thus, such conditional language is not generally intended to imply that features, elements or states are in any way required for one or more embodiments or that one or more embodiments necessarily include logic for deciding, with or without author input or prompting, whether these features, elements or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others.

What is claimed is:

1. A system comprising:
a data store configured to store computer executable instructions; and
a hardware processor in communication with the data store, the hardware processor, when executing the computer executable instructions, configured to:
receive a collection of training document images, wherein at least some of the collection of training document images corresponds to real documents supplied by end users such that training occurs persistently using the real documents,
wherein the system provides results to the end users concurrently with the persistent training;
establish a filter for application to the training document images by:
providing an array with an odd number of index entries;
assigning a sign to a center value for the array;
assigning the opposite sign to two peripheral values for the array; and
providing array orientation for evaluating vertical and horizontal morphological structure in a document image;

provide at least one hyperparameter for the filter to allow for feedback and optimization of a structure of the filter over time;
convolve the filter with data in at least one of the training document images to create a processed image; and
evaluate the processed image to identify table structure.

2. The system of claim 1, wherein convolving the filter comprises orienting the array with the opposite morphology to vertical and horizontal features such that the index entries in the filter will, when convolved across a non-parallel feature of interest, interact sequentially with that feature in the training document images to produce a signal.

3. The system of claim 2, wherein the array is initially convolved while oriented laterally to detect vertical lines and is then transposed and convolved while oriented vertically to detect horizontal lines.

4. The system of claim 3, wherein the hardware processor is further configured to use the identified table structure and compare the identified table structure to results from alternative segmentation approaches to identify and use the best results.

5. The system of claim 1, wherein the hardware processor is further configured to recursively evaluate table structure segmentation to improve results for a particular document.

6. The system of claim 5, wherein recursive evaluation of table structure segmentation is used to also improve results for a series of future documents and optimization accounts for a series of past documents, thereby preventing overfitting to a given document's particular style.

7. The system of claim 1, further comprising computer storage configured to accept quality quantifiers resulting from document processing and associate the quality quantifiers with one or more filter index values or hyperparameter values to determine one or more replacement values in an optimization cycle, resulting in filter evolution and aggregate improvement in initial document processing results for tables.

8. The system of claim 1, wherein providing at least one hyperparameter comprises providing one or more of the following:
a size parameter comprising the size of a one-dimensional array;
a multiplier parameter comprising a constant value that can adjust a magnitude of a column morphology response;
an expanded center value comprising an operator for enlarging the center portion beyond a single index value;
a ratio comprising a response between the center value and the peripheral values;
a constant comprising an initial value for intermediate values between the center and peripheral values; and
a threshold value comprising a value below which the system ignores the filter response.

9. The system of claim 1, wherein establishing the filter for application to the training document images further comprises at least one of:
multiplying a ratio hyperparameter by a peripheral value;
multiplying all values in the array by a multiplier hyperparameter; and populating intermediate index positions with a constant as an initial value.

10. The system of claim 1, further comprising using the filter multiple times by convolving the filter with data in multiple training documents, comparing results from the multiple convolutions, and using these result comparisons to optimize by using new hyperparameter values to replace old hyperparameter values when better results are obtained.

11. The system of claim 1, wherein the center value is negative and has an absolute value greater than ten, the peripheral values are between one and three, and intermediate values adjacent the peripheral values are between two and ten.

12. A system comprising:

a data store configured to store computer executable instructions; and a computing device in communication with the data store, the computing device, when executing the computer executable instructions, configured to:

receive a collection of training document images, wherein at least some of the collection of training document images corresponds to real documents supplied by end users; and use the collection to persistently train a convolution filter having index values and having hyperparameters corresponding to features of filter structure, the hyperparameters comprising at least two of the following:

a filter size corresponding to a number of index values in a one-dimensional array;

a center expansion comprising an operator for enlarging a center portion beyond a single index value;

a multiplier configured to adjust a magnitude of the filter response;

a ratio characterizing response difference between center and peripheral values in the one-dimensional array; and a threshold comprising a value below which the system ignores the filter response, wherein the system provides results to the end users concurrently with the persistent training.

13. The system of claim 12, wherein the convolution filter is configured for iterative training by obtaining silhouette scores for sequential sets of hyperparameters and accepting replacement hyperparameter values when higher silhouette scores are achieved.

14. The system of claim 13, wherein the convolution filter is further configured for iterative training by obtaining silhouette scores for sequential sets of index and hyperparameter values and accepting replacement values for each when higher silhouette scores are achieved.

15. The system of claim 12, further comprising a monitoring apparatus configured to monitor end-user interactions and decisions with results from the convolution filter, thereby inferring actual table structure.

16. The system of claim 15, wherein the convolution filter is further configured for iterative training by accepting the inferred actual table structure and adjusting index and hyperparameter values when actual table structure more closely matches processed results from the system.

17. The system of claim 12, wherein the computing device, when executing the computer executable instructions, is further configured to:

establish an initial version of the convolution filter by:

providing an array with an odd number of index entries;

accepting a sign for a center value of the array; and accepting the opposite sign for peripheral values for the array.

18. The system of claim 17, wherein the computing device, when executing the computer executable instructions, is further configured to: orient and convolve the array laterally to detect vertical column lines, transpose the array to orient it vertically and convolve the transposed array vertically to detect lateral row lines.

19. The system of claim 12, wherein the computing device, when executing the computer executable instructions, is further configured to: convolve the array across a vertical or horizontal morphological structure in a document image such that the array has an elongate axis oriented across the morphological structure when convolved, thereby interacting sequentially with a non-parallel portion of a feature of interest.

* * * * *